United States Patent

[11] 3,610,351

| [72] | Inventor | William P. Billington<br>Flitwick, England |
|---|---|---|
| [21] | Appl. No. | 13,018 |
| [22] | Filed | Feb. 20, 1970 |
| [45] | Patented | Oct. 5, 1971 |
| [73] | Assignee | National Research Development Corporation<br>London, England |
| [32] | Priority | Feb. 21, 1969 |
| [33] | | Great Britain |
| [31] | | 9515/69 |

[54] CONVEYORS
6 Claims, 2 Drawing Figs.

[52] U.S. Cl. .................................................. 177/16
[51] Int. Cl. .............................................. G01g 11/14
[50] Field of Search ...................................... 177/16

[56] References Cited
UNITED STATES PATENTS

| 1,435,250 | 11/1922 | Moakley .................. | 177/16 |
| 1,619,123 | 3/1927 | Hem ....................... | 177/16 |
| 2,918,269 | 12/1959 | Williams, Jr. ............. | 177/16 |

FOREIGN PATENTS

| 545,811 | 10/1959 | Belgium .................. | 177/16 |

Primary Examiner—Richard B. Wilkinson
Attorney—Cushman, Darby & Cushman

ABSTRACT: Weighing apparatus comprising a horizontal conveyor resiliently mounted for vertical movement to an extent related to the weight of material being carried thereby, and integrator means responsive jointly to the speed of conveying movement of the conveyor and the degree of vertical movement of the conveyor under the weight of material carried thereby to provide an indication of the weight of material conveyed during a chosen time interval.

CONVEYORS

This invention concerns a device for conveying solid material and weighing the material as it is being conveyed so as to provide an indication of delivery rate and/or total weight delivered during a period of operation of the device.

According to the invention there is provided weighing apparatus comprising a horizontal conveyor resiliently mounted for vertical movement to an extent related to the weight of material being carried thereby, and integrator means responsive jointly to the speed of conveying movement of the conveyor and the degree of vertical movement of the conveyor under the weight of material carried thereby to provide an indication of the weight of material conveyed during a chosen time interval.

The integrator means includes a driving member and a driven means displaceable with respect to each other for progressive variation in the drive transmission therebetween between (a) a first position in which no drive is transmitted from the driving member to the driven means and (b) a second position in which a maximum drive is transmitted from the driving member to the driven means. The driving member is coupled to a drive means for the conveyor so as to move at a speed directly related to the speed of conveying movement of the conveyor, and the driving member is mounted on the conveyor so as to move with vertical movements of the conveyor. The driven means is mounted on a fixed support.

Figure 1:
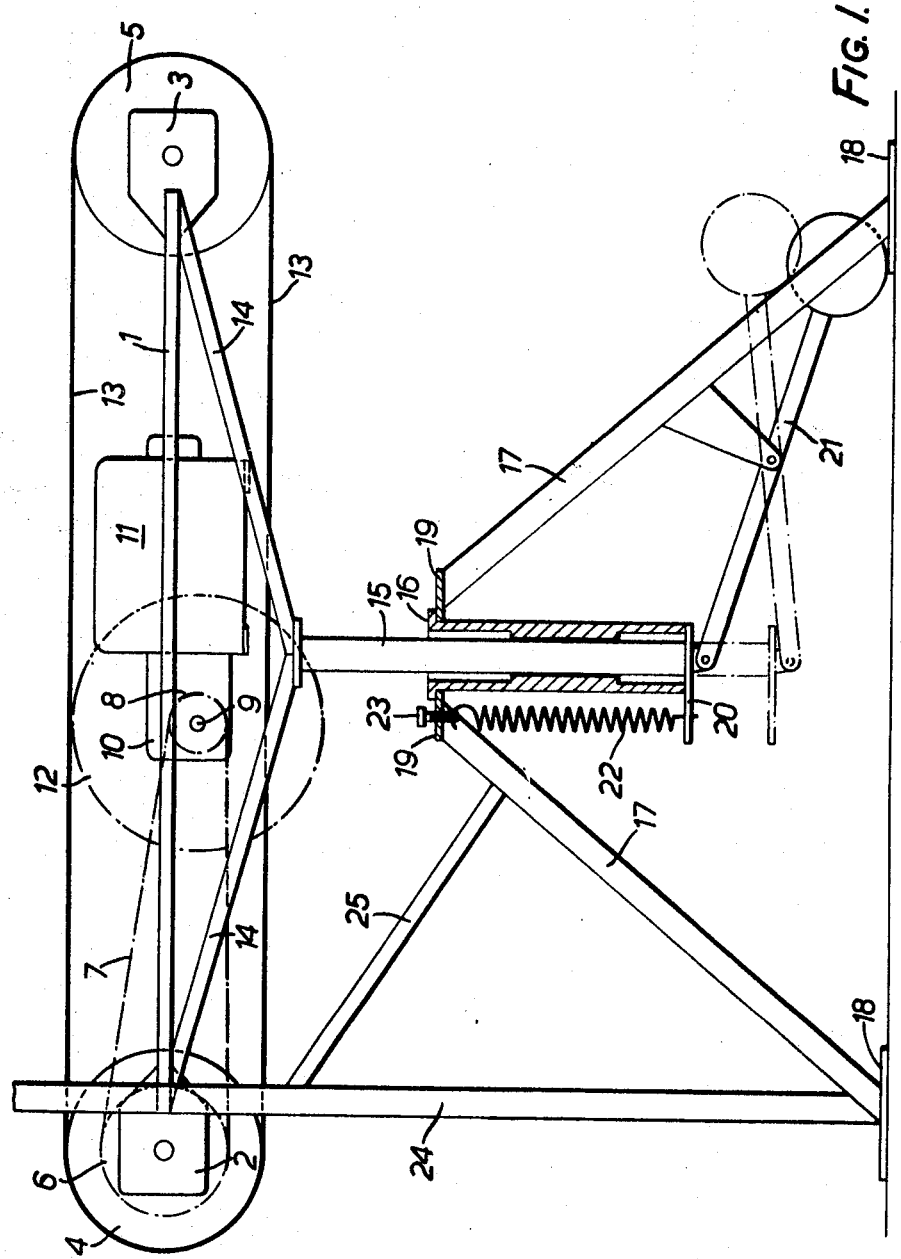
Figure 2:
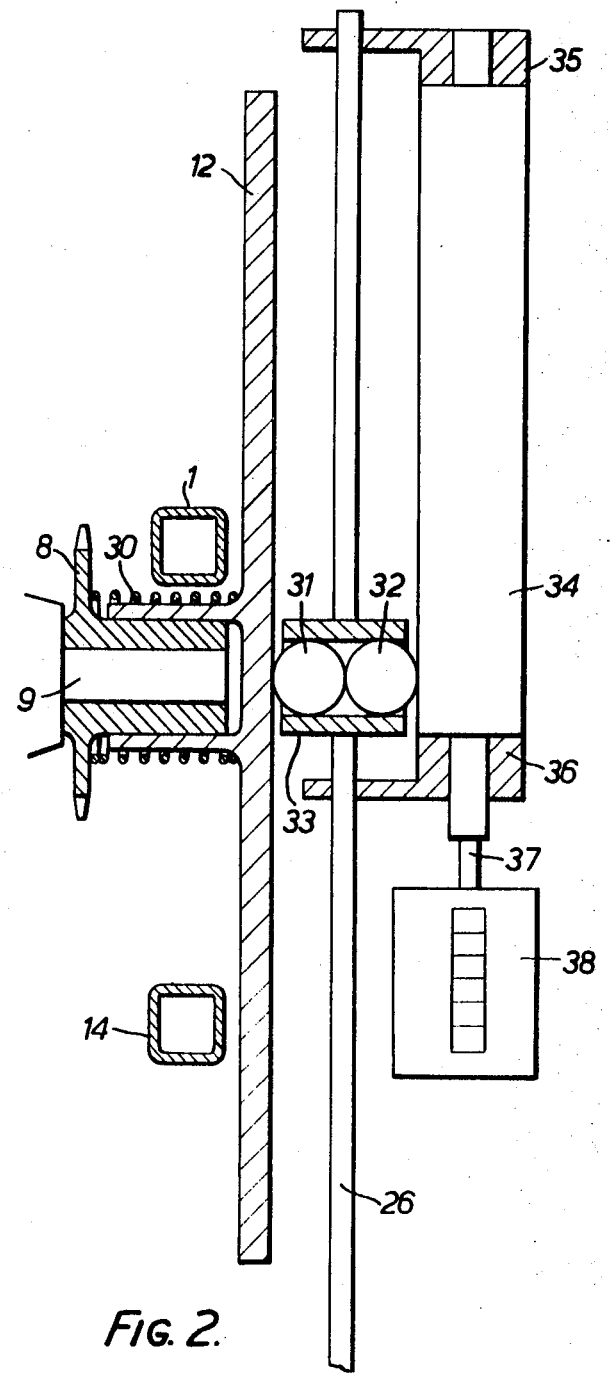

The various features and advantages of the invention will be apparent from the following description of an exemplary embodiment taken in conjunction with the accompanying drawings of which, FIG. 1 is a side elevation of a weighing conveyor embodying the invention, and FIG. 2 is a vertical sectional view of the ball-and-plate integrator utilized in the conveyor of FIG. 1.

The conveyor comprises a rectangular support frame 1 having bearings 2 and 3 at its opposite ends with a drive roller 4 rotatably mounted in bearings 2 and a guide roller 5 rotatably mounted in bearings 3. Roller 4 carries a sprocket 6 by means of which it is driven by a drive chain 7 from a sprocket 8 on the output shaft 9 of a gear box 10 driven by an electric motor 11, the gear box and motor both being mounted on the support frame 1. The shaft 9 also carries a disk 12 which forms part of the ball and plate integrator shown in section in FIG. 2. A conveyor belt 13 passes round the rollers 4 and 5.

The four corners of the frame 1 are connected by struts 14 to a column 15 centrally disposed beneath the conveyor and slidably arranged in a sleeve 16 supported from the ground by four legs such as 17 each having a foot 18 at its lower end and being secured to a flange 19 at the upper end of sleeve 16. A further flange 20 is secured to the lower end of column 15 and a counterweight arm 21 is pivotally attached to such lower end and also to a bracket secured to one of the legs 17. A tension spring 22 is anchored at one end to the flange 20 and is adjustably secured by means of a threaded bolt 23 at its other end to flange 19. The pretension of spring 22 is arranged to be such that in the absence of any load on the conveyor belt 13 the flange 20 is held against the bottom of sleeve 16 in the position shown in FIG. 1. A vertical support member 24 extending upwardly from a foot 18 of one of the legs 17 and braced to that leg by a strut 25 carries a support arm 26 on which the ball assembly of the integrator of FIG. 2 is mounted to coact with the disk 12 carried by the frame 1.

Referring to FIG. 2, the integrator comprises the disk 12 slidably mounted on the end of shaft 9 for rotation with such shaft and urged outwardly of such shaft by a compression spring 30 which acts between the disk 12 and the sprocket 8. Spring 30 thus urges disk 12 into engagement with one of two balls 31,32 housed in a sleeve 33 mounted on arm 26, the other of the two balls being thus urged into engagement with a spindle 34 journaled in support brackets 35, 36 also mounted on arm 26. One end of spindle 34 has an extension passing through bracket 36 and coupled to the drive shaft 37 of a mechanical counter 38. With the flange 20 of FIG. 1 abutting the bottom of sleeve 16 the ball 31 engages disk 12 at the center thereof as shown in FIG. 2 and rotation of the disk by the drive motor 11 does not impart any rotation to the ball 31 so that there is no drive to the counter 38.

In operation of the arrangement above described material to be conveyed is loaded on to the conveyor belt 13 at one end thereof with the motor 11 running and the belt being driven with its upper conveying surface moving towards the end opposite said one end. If the conveyor is being loaded for example from a hopper, with a continuous stream of material at a constant rate, the weight of material actually lying on the belt will increase from the moment loading commences until the moment material begins to discharge from the end opposite to the loading end. Thereafter this weight will remain constant for as long as the loading rate remains constant. With this increasing load weight the conveyor as a whole moves downwardly to an increasing extent, the column 15 moving through the sleeve 16 to cause the counterweight arm 21 to pivot about the bracket on leg 17 to which it is pivotally secured and to extend the spring 22. The extent of downward movement per increment of load weight added to the conveyor is set by the spring 22. During this downward movement of the conveyor, the disk 12 which is carried by the shaft 9 and thus by the frame 1 also moves downwardly with respect to the ball unit 31, 32, 33 so that the ball 31 is no longer in register with the center of disk 12 but is radially displaced from such center to an extent equal to such downward movement. Thus the ball 31 is rotated by the disk 12 at a rate which id proportional to its radial displacement from the center of the disk. The rotation of ball 31 is transmitted by ball 32 to the spindle 34 and thus to the drive shaft 37 of counter 38. Counter 38 is thus driven at a rate which is proportional to the speed of movement of the conveyor and the weight of material lying on the conveyor. The count registered by the counter 38 at any time is thus indicative of the throughput of conveyed material since the first material to be fed to the conveyor moved the disk 12 with respect to the ball 31.

If an indication of the rate of throughput is required this can be given, assuming constant conveyor speed, by a pointer attached to frame 1 moving over a scale attached to arm 26, or if a variable conveyor speed is to be taken into account by a ratemeter arranged to be driven from the spindle 34.

The conveyor can either be supported from beneath in the manner shown in the drawings or be supported from above from an overhead structure by having the support column extend upwardly from the frame 1.

In the claims:

1. Weighing apparatus comprising a horizontal endless belt conveyor resiliently mounted for vertical movement with respect to a fixed support to an extent related to the weight of material being carried thereby, drive means for said conveyor, mounted on said conveyor and integrator means comprising a driving member and a driven means displaceable with respect to each other for progressive variation in the drive transmission therebetween between (a) a first position in which no drive is transmitted from said driving member to said driven means and (b) a second position in which a maximum drive is transmitted from said driving member to said driven means, the driven means of said integrator means being mounted on said fixed support, the driving member of said integrator means being coupled to said drive means for said conveyor so as to move at a speed directly related to the speed of conveying movement of said conveyor and being mounted on said conveyor for vertical movement therewith relative to said driven means whereby said integrator means is jointly responsive to the speed of conveying movement of the conveyor and the degree of vertical movement of the conveyor under the weight of material carried thereby to provide an indication of the weight of material conveyed during a chosen time interval.

2. Apparatus as claimed in claim 1 wherein the conveyor is supported by a vertically arranged column slidably received in a fixed sleeve and having stop means arranged to cooperate with said sleeve to locate the conveyor when unloaded in a fixed datum position from which it moves downwardly in response to the weight of material loaded thereon and said integrator means is arranged not to respond to the speed of conveying movement of said conveyor when the latter is in said datum position.

3. Apparatus as claimed in claim 2 including pivoted counterbalance means attached to said column and arranged to counterbalance the unloaded weight of said conveyor, and tension spring means attached between said column and a fixed anchor point and tending to urge said column upwardly into said datum position.

4. Apparatus as claimed in claim 1, wherein said integrator means comprises a mechanical integrator of ball unit and plate type, the plate of which is driven in rotation by the drive means of said conveyor and is mounted on said conveyor for vertical movement therewith relative to the ball unit of said integrator.

5. Apparatus as claimed in claim 4 wherein said ball unit is mounted on a fixed part of the apparatus at a level such that a ball which engages the plate is in register with the center of such plate when the conveyor is located at the datum vertical height corresponding to its unladen state whereby the rotation of the disk is not transmitted through the integrator when the conveyor is in such datum position.

6. Apparatus as claimed in claim 5 wherein said integrator means has an output shaft coupled to drive a mechanical counter.